United States Patent [19]
Merz et al.

[11] 3,914,869
[45] Oct. 28, 1975

[54] CENTERING DEVICE

[75] Inventors: Herbert Merz, Weilheim; Willi Standke, Peissenberg, both of Germany

[73] Assignee: Feinmechanik Michael Deckel, Weilheim, Germany

[22] Filed: July 12, 1974

[21] Appl. No.: 487,910

[30] Foreign Application Priority Data
Aug. 11, 1973 Germany.............................. 2340744

[52] U.S. Cl. .............................. 33/169 C; 33/172 D
[51] Int. Cl.² ............................................ G01B 3/22
[58] Field of Search ........... 33/169 C, 172 D, 174 Q

[56] References Cited
UNITED STATES PATENTS
3,102,343 9/1963 Plank ................................ 33/172 D
3,601,897 8/1971 Muller ............................... 33/172 D FOREIGN PATENTS OR APPLICATIONS
2,017,304 2/1971 Germany

*Primary Examiner*—Richard E. Aegerter
*Assistant Examiner*—Willis Little
*Attorney, Agent, or Firm*—Woodhams, Blanchard and Flynn

[57] ABSTRACT

Centering device for use with the spindle of a machine tool. There is provided a centering device for application to the spindle of a machine tool in which the feeler of the centering device is pivotal through a plane substantially radial of such spindle, and the deflections resulting from inaccuracies in the shaft or hole being examined are transmitted to an indicator. In the invention, the measuring range and accuracy of the device are increased by spacing the axis of the feeler radially and fixedly from the projected axis of such spindle. Other features include the transmission of forces through perpendicularly positioned rollers fixed respectively into adjacent levers. A further feature includes a locking device comprising a pin projecting into an opening in one of said levers with an enlargement of said openings surrounding said pin when same is in its inactive position to avoid damage thereto by excessive movement of the feeler and resulting movement of the lever. Other advantageous features are developed in detail in the following specification.

9 Claims, 4 Drawing Figures

CENTERING DEVICE

FIELD OF THE INVENTION

This invention relates to centering devices which can be inserted into the spindle of a machine tool, said device having a feeler which is swingable substantially radially to the spindle axis of the machine tool and the deflections of which, produced by the bore or shaft to be centered, are transmitted onto a measuring device. Such devices already exist in two different types of construction.

BACKGROUND OF THE INVENTION

One such construction intended for large measuring ranges has a rail which is diametric to the spindle axis, along which rail the feeler with its support is movable in order to be adjustable for larger diameters. This construction is structurally complicated and expensive and has in the many transfer members between feeler and measuring device many sources for errors. Because of this limitation, a different construction has been developed and has become known which, by eliminating the radial adjustability of the feeler support, can be manufactured at substantially less expense. This, however, has only a correspondingly small measuring range.

The invention relates to this latter construction and has the purpose of providing a larger measuring range for this construction without having to enlarge the housing which carries the feeler, inasmuch as to do so would be disadvantageous for the usability of the device.

In the aforementioned devices of the second-named type of construction, the feeler has so far always been centrally supported, namely in the spindle axis. This was true because the device was supposed to be usable with the same direction of measuring deflections both for shafts and for bores. Thus the feeler must be adjustable in its zero or starting position, which lies on one side of the spindle axis for bores and diametrically on the other side of same for shafts, so that in both cases the measuring pressure is directed toward the surface which is to be measured. The central arrangement for the feeler support was thus obviously the best when the measuring range was to be fully available both for bores and for shafts.

SUMMARY OF THE INVENTION

The invention shows a way to avoid the central arrangement of the feeler support which is actually unfavorable for the size of the measuring range and to thus enlarge the measuring range. It consists in that (in the case of a device of the second-mentioned type, which is also the less expensive of the two) the swivel axis of the feeler is arranged at a fixed distance from the spindle axis. The measuring range is thus increased as the spindle distance of the feeler support increases. In the upward direction this distance is limited only by the diameter of the housing. The feeler support is therefore advantageously positioned as close as possible to the edge of the housing.

The invention has particular importance in centering devices of the second-mentioned type of construction, in which the deflections of the feeler are transmitted to the sensor of the measuring device through a transfer mechanism which consists of single-arm engaging levers.

Since the sensor of this measuring device is arranged as a rule concentrically to the spindle axis, in order to avoid planetary movements of the measuring device — as is for example shown in German Pat. No. 2 017 304 — the transfer levers extend substantially transversely to the axis of the spindle or the device. If according to the invention the swivel axis of the feeler is arranged at a fixed distance from the spindle axis, then it is possible to store the transfer levers with substantially larger effective lever arms in the housing than was possible in the case of a centrally arranged swivel axis. An enlargement in size of the effective lever arms means a gain of precision in the transfer of, or a reduction of the effect of, manufacturing inaccuracies. This results in a less expensive device. Further, longer lever arms cause smaller angle deflections of the levers and thus reduce friction losses and reduce bearing pressures.

The increased precision and reduction in price is served also by a further characteristic of the invention in a device with a transfer mechanism which consists of levers with parallel axes — compare the above-mentioned German Pat. No. 2 017 304. This further characteristic consists in that at the contact point of the levers hardened rollers are inserted into the levers, of which one is arranged parallel to the lever axes and the other one perpendicularly thereto. Such rollers are inexpensive parts having a high exactness and result in the described arrangement in point contacts. In this manner, the sliding friction in the contact point is substantially converted into rolling movement and this improves precision.

In the practical handling of the centering device it is difficult, particularly when precision measuring instruments with a small measuring range are used, to adjust the feeler in such a manner that the zero deflection of the measuring device desired for centering lies approximately in the center of its measuring range. According to a further characteristic of the invention, a manually operated device is therefore provided which brings the feeler lever, or a part connected to it, into its central position and locks same there. If in this condition of the device the feeler is adjusted until it contacts the article which is to be centered, then there is provided increased security that the deflections of the measuring device toward both sides lie within its measuring range. Without this device, an adjusting of the feeler through a direct contact with the measuring object is not possible or is possible only through readjusting.

In a preferred embodiment the locking mechanism is constructed as a locating pin which is pressed from the outside, advantageously against spring pressure, into a locating bore having an entry cone, which locating bore is approximately perpendicular to the swivel movement of the feeler or the part which is connected to it. In a further development of this characteristic, a larger bore is provided concentrically to the locating bore, into which larger bore projects the locating pin in its uncompressed position with a clearance corresponding to the permissible swing of the feeler lever. In this manner, excessively large deflections of the feeler, which fall beyond the measuring range of the measuring device, are prevented from damaging the measuring device. At the same time, in this manner, the adjustment of the feeler — in relationship to the transfer mechanism operated by it — is corrected, so that an automatic adjustment of the feeler adjustment with respect to the measuring device is often the consequence thereof.

In order to be able to center in a simple manner both shafts and bores, according to a further characteristic of the invention, the direction of the measuring pressure is reversed, namely through an additional spring, to load the feeler lever or a part connected to it in the opposite direction with respect to the spring of the measuring device. If the additional spring is constructed so that it can be inactivated, then the operation of the device can be selected to provide an effective additional spring for shafts, with an inactivated additional spring for bores — or vice versa.

To inactivate the additional spring, the locating pin may advantageously be rotatable and may have in the zone of the additional spring a cam to lift same off therefrom.

Further characteristics of the invention can be derived from a description of an exemplary embodiment in connection with the drawings and the claims.

DETAILED DESCRIPTION

Figure 1:
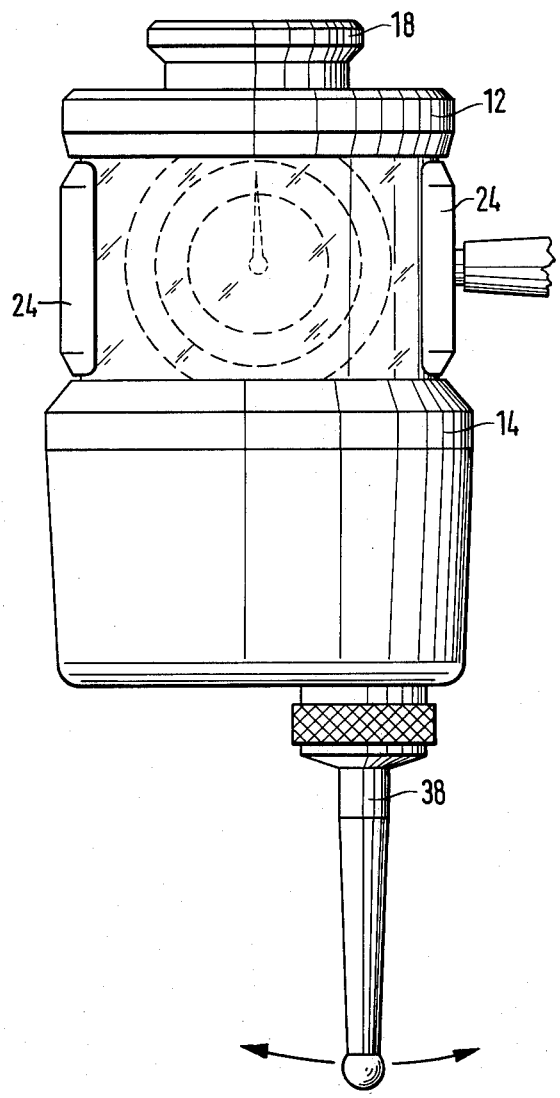
FIG. 1 is a front view of a centering device.

In a glass cylinder 10 which has an upper cover 12 and a lower flange 14, a dial gauge 16 is centrally arranged. The upper cover 12 has a neck 18 with which it can be secured in a receiving shaft (not illustrated) which in turn can be inserted into the spindle of a machine tool. The dial gauge 16 is supported on a plate 22 by means of a ball bearing 20, which plate is screwed onto the lower flange 14. During rotation of the tool spindle and of the glass cylinder 10, the dial gauge is held by known magnetic means 24 which are provided stationarily outside of the cylinder (FIG. 1), so that it does not participate in the rotation of the tool spindle; thus it can be watched and read continuously during the rotation of the spindle. The ball bearing 20 is covered by a plate 25.

Figure 2:
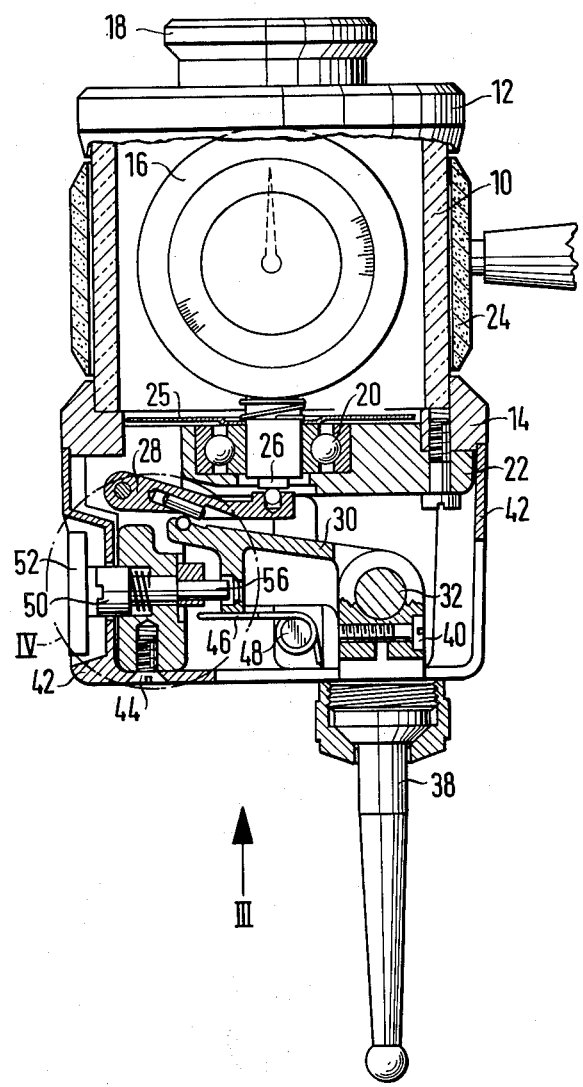
FIG. 2 is a central cross-sectional view of the device according to FIG. 1.
Figure 3:
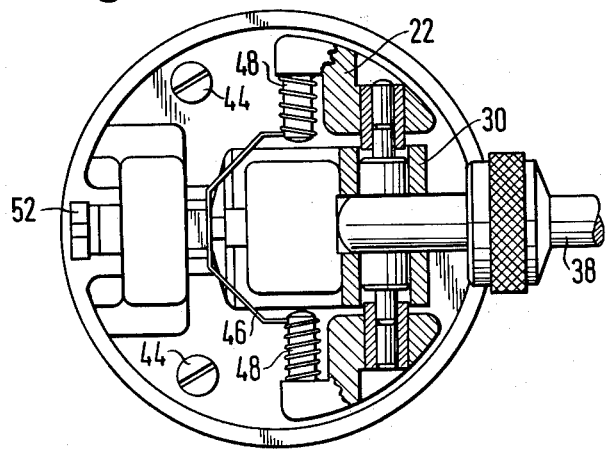
FIG. 3 is a view in the direction of the arrow III of FIG. 2.
Figure 4:
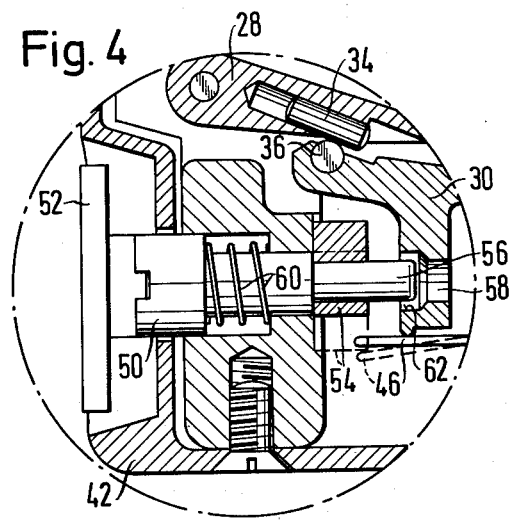
FIG. 4 illustrates in an enlarged scale a detail from FIG. 2.

The sensor 26 of the dial gauge 16 is positioned on a ball which is pressed into an opening of the lever 28. The lever 28 has contact with a second lever 30, which is pivotal about the pin 32. The contact point is formed by two rollers 34, 36 (FIG. 4) which are pressed perpendicularly with respect to one another into the levers 28 and 30 and contact one another with their hardened surfaces. As seen in FIG. 2, in the central position of the levers 28 and 30, their contact point lies in the plane common to their pivot axes. The spring force of the dial gauge 16 is transmitted onto the pin 32 by the levers 28, 30 and is thus transmitted to a feeler 38 which is clamped onto the pin 32 by means of a clamping screw 40, so that it can be adjusted on the axis by overcoming the clamping force. These parts are covered from below by a cap 42 which is mounted on the lower flange 14 and is screwed on tightly by screws 44. (In FIG. 3, the cap 42 is removed.) In order to be able to reverse the direction of the deflections of the feeler 38, thus to direct the deflections for centering of the shafts inwardly, an additional spring 46 is mounted onto two pins 48 of the plate 22; the additional spring 46 bears onto the lever 30 and is stronger than the spring of the dial gauge. The spring 46 can, as is shown by dashed lines in FIG. 4, be lifted off, i.e. deflected away from, the lever 30 by rotation of a pin 50 by means of a crossbar 52, for which purpose a cam 54 is provided on the pin 50; then the spring of the dial gauge 16 alone is effective so that the bores can be centered. The cam 54 has a surface (FIG. 3), so that the pin 50 is fixed in its rotary position by the additional spring 46.

The pin 50 is constructed as a locating pin at its inner end 56, exactly opposite of which locating pin there is positioned a locating bore 58 in the lever 30, when the latter is approximately in its central position. The pin 50 can be introduced into the locating bore 58, through pressure onto the crossbar 52 and resultant compressive deformation of a pressure spring 60, through which the lever 30 is fixed. Through this, forces, which are created during the adjustment by pivoting of the feeler 38 about the pin 32, are kept away from the dial gauge 16. The thus-achieved central position of the levers 28, 30 — and thus also of the dial gauge 16 — assures that on both sides of the adjusted feeler position in which the feeler contacts the measuring object, there is available a sufficient measuring or indicating zone of the dial gauge.

The locating pin 56 projects in its rest (outer) position — as illustrated — into a further bore 62. Same is larger than the locating bore 58 and permits sufficient clearance of movement for the lever 30 that the limits of the measuring zone of the dial gauge are not quite reached. Thus, a hard impact onto the feeler cannot harm for the dial gauge.

The effective lever arms of the levers 28 and 30 are so dimensioned with respect to the length of the feeler that the dial gauge indicates directly the feeler deflections.

Although a particular preferred embodiment of the invention has been disclosed above for illustrative purposes, it will be understood that variations or modifications thereof which lie within the scope of the appended claims are fully contemplated.

We claim:

1. A centering device engageable with the spindle of a machine tool, comprising:
    a measuring device and actuating means therefor, said actuating means including a substantially radially swingable feeler having a swing axis and means transferring the deflections of said swingable feeler to said measuring device, said actuating means further including locating means carried on said transfer means for defining the central position of said feeler, transfer means and measuring device;
    said centering device further comprising means fixedly positioning the swing axis of the feeler at a constant distance from the spindle axis; and
    manually operable means engageable with said locating means for bringing the feeler and transfer means and measuring device into said central position and for locking the transfer means and measuring device there.

2. A centering device according to claim 1 in which said locating means comprising a bore on one swingable portion of said actuating means and having an entry cone, said manually operable means including a locating pin urgeable from outside the centering device into said bore, and a spring resiliently oppositely urging said locating pin to a rest position outside said bore, said bore further being approximately perpendicular to the swinging movement of said swingable portion of said actuating means on which it is located.

3. A centering device according to claim 2 in which said entry cone comprises an enlarged bore concentric with the first mentioned bore, the locating pin in its rest position projecting into said enlarged bore with a clearance, said clearance setting the limits of permissible feeler swing.

4. A centering device according to claim 1 in which said measuring device includes spring means biasing said actuating means in one direction and including additional spring means engageable with said transferring means for biasing the latter in the opposite direction to that urged by said spring means of the measuring device.

5. A centering device according to claim 4 including means operable for inactivating said additional spring means.

6. A centering device according to claim 2 in which said transferring means comprises a pair of engageable and pivoted single-arm levers serially connecting said feeler with said measuring device, the feeler-connected one of said levers carrying said bore.

7. A centering device according to claim 2 in which said measuring device includes spring means biasing said actuating means in one direction and including additional spring means engageable with said transferring means biasing it in the opposite direction to that urged by said spring means of the measuring device and means operable for inactivating said additional spring means, said locating pin being rotatable, said means for inactivating said additional spring means including a cam on said locating pin adjacent said additional spring means and rotatable with said locating pin for engaging said additional spring means and lifting same away from said transferring means.

8. A centering device engageable with the spindle of a machine tool, comprising:
   a measuring device having a sensor;
   a substantially radially swingable feeler having a swing axis;
   transfer means for transmitting therethrough the deflections of said swingable feeler to said sensor of said measuring device, said transfer means comprising single-arm engaging levers pivotally carried on said centering device;
   means fixedly locating said swing axis of said feeler at a constant distance from the spindle axis, said levers comprising a pair of levers carried on parallel pivot axes and a point of contact therebetween, and including, at said contact point of said levers, hardened contacting rollers each inserted into a corresponding one of the levers, one said roller being parallel to one lever axis and the other said roller being perpendicular to said one roller.

9. A centering device according to claim 8 in which, in the central pivoted position of the levers, said contact point lies in the plane common to the pivot axes of said pair of levers.

* * * * *